United States Patent
Ota et al.

(10) Patent No.: US 11,764,398 B1
(45) Date of Patent: Sep. 19, 2023

(54) INORGANIC PRECURSORS FOR IONIC CONDUCTORS

(71) Applicant: Toyota Motor Engineering & Manufacturing North America, Inc., Plano, TX (US)

(72) Inventors: Shingo Ota, Ann Arbor, MI (US); Ryuta Sugiura, Ann Arbor, MI (US); Timothy S. Arthur, Ann Arbor, MI (US); Nikhilendra Singh, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/732,964

(22) Filed: Apr. 29, 2022

(51) Int. Cl.
 *C01F 7/00* (2022.01)
 *H01M 10/0562* (2010.01)
 (Continued)

(52) U.S. Cl.
 CPC ........... *H01M 10/0562* (2013.01); *C01F 7/00* (2013.01); *C01F 17/20* (2020.01); *C01G 49/00* (2013.01); *H01M 4/0407* (2013.01); *H01M 4/139* (2013.01); *H01M 4/62* (2013.01); *H01M 10/052* (2013.01); *C01P 2002/52* (2013.01); *C01P 2002/72* (2013.01); *C01P 2006/40* (2013.01); *H01M 2004/028* (2013.01); *H01M 2300/008* (2013.01)

(58) Field of Classification Search
 CPC ... C01G 49/10; C01G 49/009; C01F 7/48–52; C01F 17/259; C01F 17/30; H01M 10/0562; H01M 10/052; H01M 4/0407; H01M 4/139; H01M 4/62; C01P 2002/52; C01P 2002/72; C01P 2006/40
 See application file for complete search history.

(56) References Cited

U.S. PATENT DOCUMENTS

| 3,365,269 A | * | 1/1968 | Chamberland ..... C04B 35/2666 |
| | | | 423/464 |
| 2008/0191168 A1 | | 8/2008 | McKigney et al. |
| (Continued) | | | |

FOREIGN PATENT DOCUMENTS

WO   WO2012-176907   * 12/2012

OTHER PUBLICATIONS

WO2012-176907 A1, Dec. 2012 (Year: 2012).*
(Continued)

*Primary Examiner* — Steven J Bos
(74) *Attorney, Agent, or Firm* — Christopher G. Darrow; DARROW MUSTAFA PC

(57) ABSTRACT

A method of synthesizing an inorganic precursor for an ionic conductor includes mixing at least one oxide of M with at least one halide of M, heating the mixture of the at least one oxide of M and the at least one halide of M and forming an MOX inorganic oxyhalide compound, and injecting defects in the MOX inorganic oxyhalide compound and forming a defect doped (MOX)' precursor for an ionic conductor. The element or component M is selected from at least one of Fe, Al, La, and Y, the at least one halide of M is selected from at least one of a fluoride of M, a chloride of M, a bromide of M, and an iodide of M, and the element or component X is at least one of F, Cl, Br, and I.

20 Claims, 2 Drawing Sheets

(51) Int. Cl.
    *H01M 10/052*    (2010.01)
    *H01M 4/139*    (2010.01)
    *H01M 4/62*    (2006.01)
    *H01M 4/04*    (2006.01)
    *C01F 17/20*    (2020.01)
    *C01G 49/00*    (2006.01)
    *H01M 4/02*    (2006.01)

(56) References Cited

U.S. PATENT DOCUMENTS

2014/0186708 A1* 7/2014 Pereira ............ H01M 4/525
                                                    429/221
2019/0062176 A1   2/2019 Weller et al.

OTHER PUBLICATIONS

Wei et al., "Cu(II) doped FeOCl as an efficient photo-Fenton catalyst for phenol degradation at mild pH," Colloids and Surfaces A: Physicochemical and Engineering Aspects, vol. 631, Dec. 20, 2021, 3 pages.
Tan et al., "Cobalt doped iron oxychloride as efficient heterogeneous Fenton catalyst for degradation of paracetamol and phenacetin," Chemosphere, vol. 263, Jan. 2021, pp. 1-9.

* cited by examiner

INORGANIC PRECURSORS FOR IONIC CONDUCTORS

CROSS-REFERENCE TO RELATED APPLICATIONS

The present application is related to U.S. patent application Ser. No. 17/732,644, filed Apr. 29, 2022, U.S. patent application Ser. No. 17/732,782, filed Apr. 29, 2022, U.S. patent application Ser. No. 17/732,736, filed Apr. 29, 2022, and U.S. patent application Ser. No. 17/732,758, filed Apr. 29, 2022, all of which are incorporated herein by reference in their entirety.

TECHNICAL FIELD

The present disclosure generally relates to ionic conductors, and particularly to inorganic precursors for ionic conductors.

BACKGROUND

Solid-state inorganic electrolytes provide many advantages in secondary battery design, including mechanical stability, no volatility, and ease of construction. However, $H_2S$ gas can be generated during decomposition of traditional sulfide solid-state inorganic electrolytes and traditional oxide solid-state inorganic electrolytes can have issues with formability due to hardness of the oxide.

The present disclosure addresses these issues with solid-state inorganic electrolytes, and other issues related to solid-state ionic conductors.

SUMMARY

In one form of the present disclosure, an inorganic precursor for an ionic conductor includes a defected doped inorganic compound comprising a chemical composition of (MOX)', where M is at least one of Fe, Al, Sc, La or Y, and X is at least one of F, Cl, Br, or I.

In another form of the present disclosure, an inorganic precursor for an ionic conductor includes a defected doped inorganic compound comprising a chemical composition of (MOX)', where M is at least one of Fe, Al, Sc, La or Y, and X is at least one of F, Cl, Br, or I. Also, the defect doped inorganic precursor includes or has a crystal structure that reflects or exhibits x-ray diffraction peaks with a 2θ between about 63.3° and about 65.3°, and between about 76.6° and about 78.6°.

In still another form of the present disclosure, a method of synthesizing an inorganic precursor for an ionic conductor includes mixing at least one oxide of M with at least one halide of M, heating the mixture of the at least one oxide of M and the at least one halide of M and forming an MOX inorganic oxyhalide compound, and injecting defects in the MOX inorganic oxyhalide compound and forming a defect doped MOX' precursor for an ionic conductor. The element or component 'M' is selected from at least one of Fe, Al, La, and Y, and the at least one halide of M is selected from at least one of a fluoride of M, a chloride of M, a bromide of M, and an iodide of M. Also, the element or component X is at least one of F, Cl, Br, and I.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides inorganic precursors for an ionic conductor and a method of synthesizing inorganic precursors for an ionic conductor. The inorganic precursors include a defect doped inorganic oxyhalide compound with a chemical composition of (MOX)', and where M is at least one of Fe, Al, Sc, La or Y, X is at least one of F, Cl, Br, or I, and the nomenclature "(MOX)'" refers to the inorganic compound MOX that is defect doped (i.e., defects have been intentionally added to the inorganic compound MOX) and the nomenclature "MOX" refers to an undoped MOX inorganic compound (i.e., defects have not been intentionally added to the inorganic compound MOX). In addition, the term "precursor" us used herein refers to an inorganic compound that is part of and used during the synthesis or forming of a solid-state electrolyte.

The method of synthesizing the inorganic precursors includes mixing at least one oxide of M with at least one halide of M, heating the mixture of the at least one oxide of M and the at least one halide of M and forming an MOX inorganic oxyhalide compound, and injecting defects in the MOX inorganic oxyhalide compound and forming a defect doped (MOX)' precursor for an ionic conductor. The component or species M is selected from at least one Fe, Al, La, and Y, and the at least one halide of M is selected from at least one of a fluoride of M, a chloride of M, a bromide of M, and an iodide of M.

Figure 1:
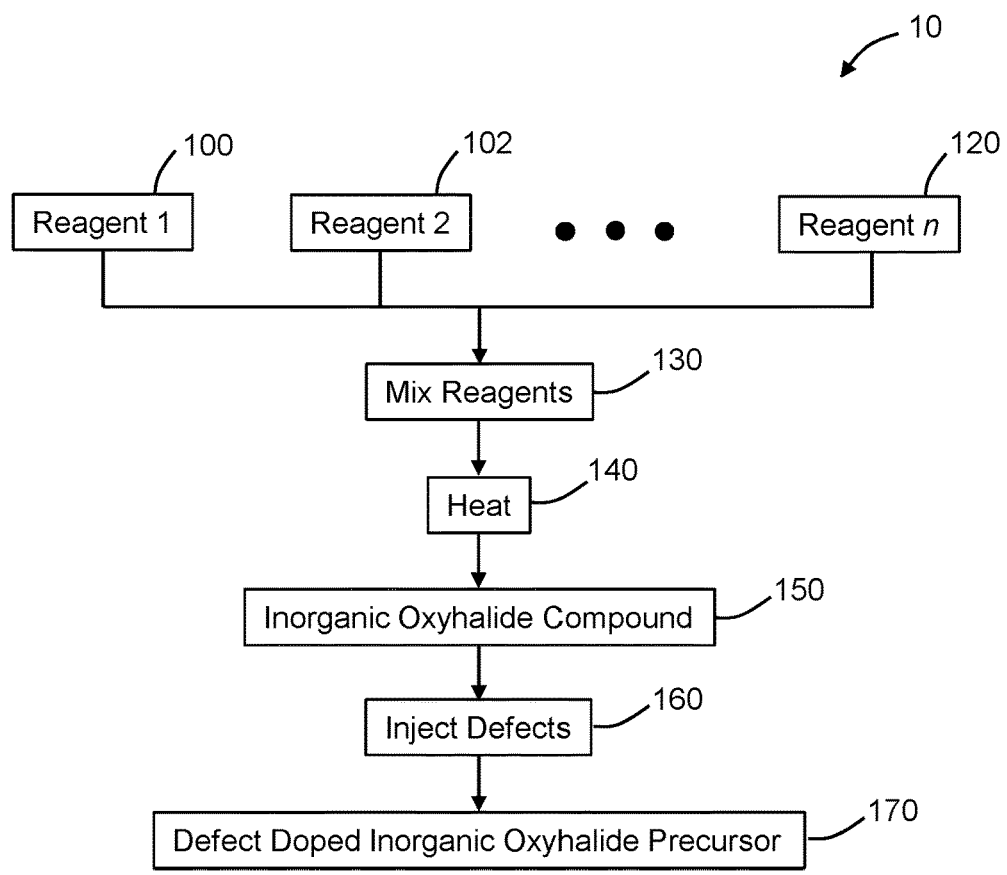
FIG. 1 is a flow chart for synthesizing a defect doped inorganic oxyhalide precursor for an ionic conductor according to the teachings of the present disclosure.

Referring now to FIG. 1, a flow chart of one non-limiting method 10 for synthesizing a defect doped inorganic precursor according to the teachings of the present disclosure is shown. The method 10 includes mixing two or more reagents 100, 102, ... 120 at 130. For example, the two or more reagents 100, 102, ... 120 can be weighed and mixed in an argon (Ar) glove box with a dew point less than about 90° C.

In some variations, the one or more reagents 100, 102, ... 120 include at least one oxide of M and at least one halide of M. For example, in at least one variation M is at least one of Fe, Al, Sc, La, and Y, and the at least one halide of M is at least one of a fluoride of M, a chloride of M, a bromide of M, and an iodide of M. Examples of oxides of M include $Sc_2O_3$, $Al_2O_3$, $Fe_2O_3$, $Y_2O_3$, and $La_2O_3$, among others, and examples of halides of M include $ScF_3$, $ScCl_3$, $ScBr_3$, $ScI_3$, $AlF_3$, $AlCl_3$, $AlBr_3$, $AlI_3$, $FeF_3$, $FeCl_3$, $FeBr_3$, $FeI_3$, $YF_3$, $YCl_3$, $YBr_3$, $YI_3$, $LaF_3$, $LaCl_3$, $LaBr_3$, and $LaI_3$, among others. Also, in some variations, the reagents 100, 102, ... 120 are in the form of powders and the powders can be mechanically mixed (together). For example, in some variations, powders of the reagents 100, 102, ... 120 are mechanically mixed at 130 using a mortar and pestle and/or a ball mill such that a mechanical mixture of the oxide and halide powders is formed.

Heat is applied to the mixture of reagents at 140 and an inorganic oxyhalide compound is formed at 150. In some variations, the mixture of reagents is heated to a temperature above 100° C., for example above 200° C. For example, the mixture of reagents can be vacuum sealed in a container (e.g., a glass tube) and heated within the container to form the inorganic oxyhalide compound at 150.

Defects are injected into or formed within the inorganic oxyhalide compound at 160. The defects can be injected into or formed within the inorganic oxyhalide compound using any method or technique such that a desired defect amount (i.e., concentration) or range of defect concentration is present in the inorganic oxyhalide compound and the defect doped inorganic precursor is formed as shown at 170 in FIG. 1. In some variations, the defects (e.g., vacancies) are injected into or formed within the inorganic oxyhalide compound by placing the inorganic oxyhalide compound in contact with a polar solvent and/or a reducing atmosphere such as an argon-hydrogen gas mixture and/or a vacuum. In at least one variation, heat is applied to the polar solvent, and/or the reducing atmosphere, and the inorganic compound, while in another variation, pressure is applied to the polar solvent, and/or the reducing atmosphere, and the inorganic compound. And in some variations, heat and pressure are applied to the polar solvent, and/or the reducing atmosphere, and the inorganic compound.

In one example, the inorganic oxyhalide compound FeOCl was synthesized by weighing and mixing together powders of $Fe_2O_3$ and $FeCl_3$, vacuum sealing the mixture of powders in a glass tube, and heating the mixture of powders in the vacuumed sealed glass tube to a predetermined temperature for a predetermined period of time. Also, the inorganic oxyhalide compound FeOCl was injected with defects and a defect doped (FeOCl)' precursor was formed for testing as described below.

Figure 2:
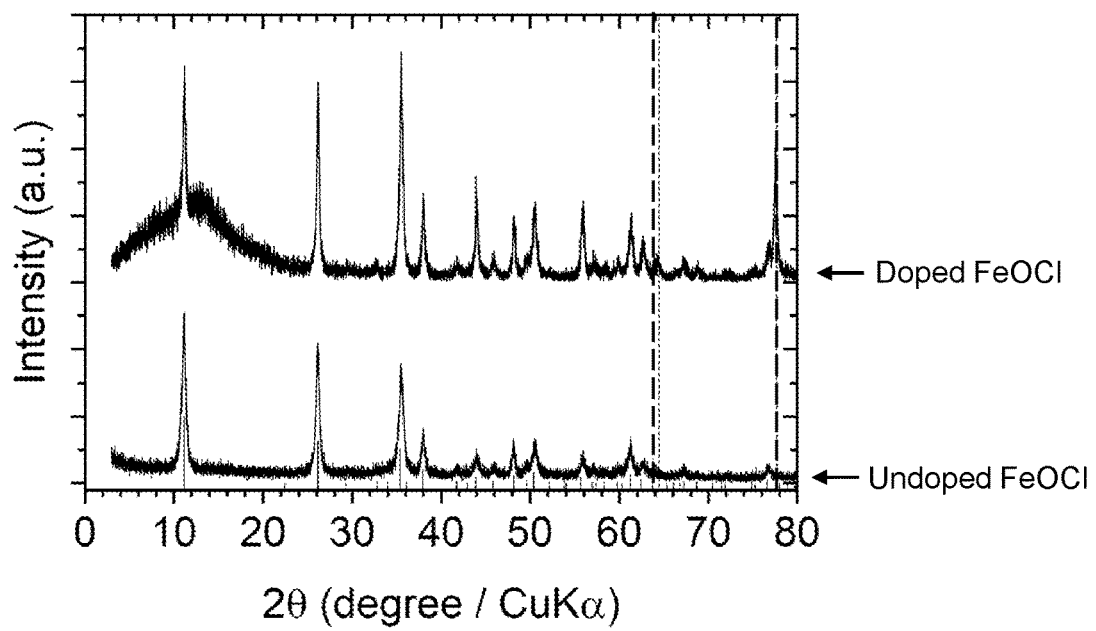
FIG. 2 is a plot of intensity versus angle 2θ for an x-ray diffraction (XRD) scan of a defect doped inorganic oxyhalide precursor according to the teachings of the present disclosure and an undoped oxyhalide precursor.

Referring to FIG. 2, plots of intensity versus angle 2θ for XRD scans of a sample of the defect doped (FeOCl)' precursor and a sample of undoped FeOCl are shown. And as observed by the XRD scans in FIG. 2, the defect doped (FeOCl)' precursor has a crystal structure that reflects at least two additional XRD peaks between about between about 63.3° and about 65.3°, and between about 76.6° and about 78.6°, compared to the XRD scan of the undoped FeOCl.

Figure 3:
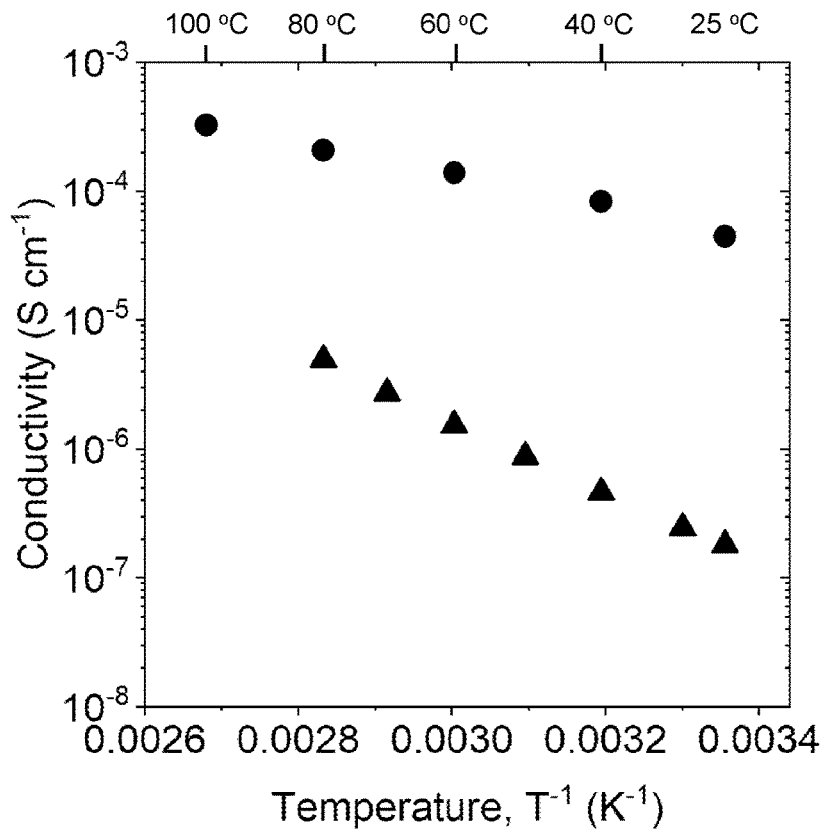
FIG. 3 is an Arrhenius plot of cationic conductivity versus temperature for a lithium (Li) solid-state electrolyte containing undoped FeOCl and a Li solid-state electrolyte containing defect doped FeOCl according to the teachings of the present disclosure.
Figure 4:
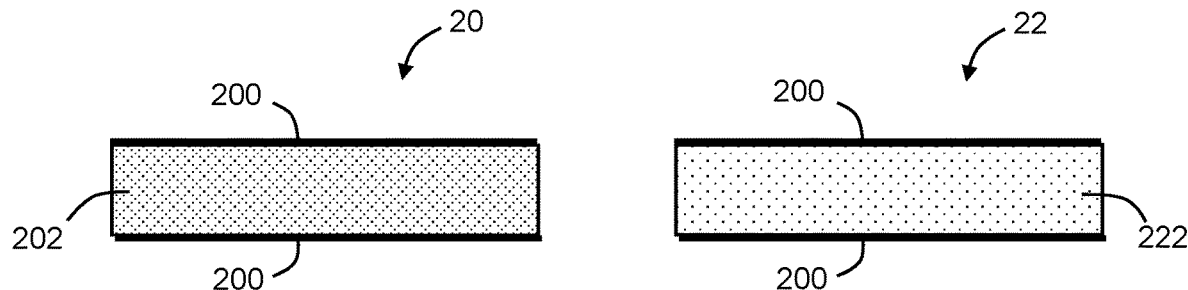
FIG. 4 shows an electrochemical cell with a Li solid-state electrolyte containing a defect doped inorganic oxyhalide precursor according to the teachings of the present disclosure and an electrochemical cell with a Li solid-state electrolyte not containing the undoped inorganic oxyhalide precursor.

Referring to FIG. 3, an Arrhenius plot of cationic conductivities versus temperature for a Li solid-state electrolyte formed with and including the defect doped (FeOCl)' precursor (also referred to herein simply as "defect doped Li solid-state electrolyte") and a Li solid-state electrolyte formed with and including FeOCl, but without the defect doped (FeOCl)' precursor (also referred to herein simply as "doped Li solid-state electrolyte"), is shown. Particularly, powder of LiCl was mixed with either powder of the defect doped (FeOCl)' or undoped FeOCl as described above, and the mixtures of LiCl—(FeOCl)' and LiCl—FeOCl powder were each heat treated at about 230° C. for about 40 hours in an Ar atmosphere to form powders of the doped Li solid-state electrolyte and the undoped Li solid-state electrolyte. The powders of the defect doped Li solid-state electrolyte and the doped Li solid-state electrolyte were compressed into cylindrical pellets using uni-axial pressure and the cylindrical pellets were sandwiched between 0.05 mm thick gold foil electrodes 200 to form electrochemical cells 20 with the defect doped Li solid-state electrolyte doped 202 and electrochemical cells 22 with the doped Li solid-state electrolyte 222 as illustrated in FIG. 4. Also, the electrochemical cells 20, 22 were subjected to AC impedance testing with an applied frequency range between $10^6$ to $10^1$ Hertz using a Biologic VMP3 multichannel potentiostat/galvanostat with an impedance analyzer.

Still referring to FIG. 3, the defect doped Li solid-state electrolyte exhibited a cationic conductivity of about $4.5 \times 10^{-5}$ S/cm at 25° C., about $8.3 \times 10^{-5}$ S/cm at 40° C., about $1.3 \times 10^{-4}$ S/cm at 60° C., about $2.1 \times 10^{-4}$ S/cm at 80° C., and about $3.3 \times 10^{-4}$ S/cm at 100° C. In contrast, the doped Li solid-state electrolyte exhibited a cationic conductivity of about $1.9 \times 10^{-7}$ S/cm at 25° C., about $4.9 \times 10^{-7}$ S/cm at 40° C., about $1.7 \times 10^{-6}$ S/cm at 60° C., and about $5.0 \times 10^{-6}$ S/cm at 80° C. Accordingly, the defect doped Li solid-state electrolyte exhibited a cationic conductivity more than two orders of magnitude greater than a cationic conductivity of the doped Li solid-state electrolyte.

Figure 5:
FIG. 5 shows a positive electrode coating layer containing a defect doped inorganic oxyhalide precursor according to the teachings of the present disclosure.

In view of the teachings of the present disclosure, it should be understood that a defect doped Li solid-state electrolyte formed with and containing defect doped inorganic precursors (MOX)' according to the teachings of the present disclosure exhibits enhanced cationic conductivity compared to doped Li solid-state electrolytes formed with and containing inorganic precursors MOX, but without the presence of (MOX)'. In addition, in some variations a defect doped inorganic precursor (MOX)' according to the teachings of the present disclosure is in the form of and/or part of a positive electrode coating layer 204 on a positive electrode 200p as illustrated in FIG. 5.

In some variations of the present disclosure, a defect doped Li solid-state electrolyte and/or a positive electrode coating layer containing a defect doped inorganic precursor (MOX)' exhibits a cationic conductivity greater than or equal to $1.0 \times 10^{-5}$ S/cm and less than or equal to about $7.5 \times 10^{-5}$ S/cm at 25° C., greater than or equal to $5.0 \times 10^{-5}$ S/cm and less than or equal to about $2.5 \times 10^{-4}$ S/cm at 40° C., greater than or equal to $1.0 \times 10^{-4}$ S/cm and less than or equal to about $9.5 \times 10^{-5}$ S/cm at 60° C., greater than or equal to $1.0 \times 10^{-4}$ S/cm and less than or equal to about $3.0 \times 10^{-4}$ S/cm at 80° C., and/or greater than or equal to $2.5 \times 10^{-4}$ S/cm and less than or equal to about $4.5 \times 10^{-4}$ S/cm at 100° C. Accordingly, the defect doped Li solid-state electrolyte and/or positive electrode coating layer containing the inorganic oxychloride ionic conductor according to the teachings of the present disclosure exhibits a cationic conductivity that is about one order of magnitude greater than traditional $LiNbO_3$ and $Li_3BO_3$ solid-state electrolytes and/or positive electrode coating layers. For example, the highest known conductivity of $LiNbO_3$ is $4.5 \times 10^{-6}$ S/cm at room temperature as reported or disclosed in the reference titled "Electrical and optical properties of Li-doped LiBOa and LiNb03 films" by N. Can et al, Journal of Applied Physics, 76 (1994) p. 4327-4331, and the highest known conductivity of $Li_3BO_3$ at 25° C. is $2 \times 10^{-6}$ S/cm as reported or disclosed in the reference titled "All-solid-state lithium ion battery using garnet-type oxide and Li3BO3 solid electrolytes fabricated by screen-printing" by S. Ohta et al., Journal of Power Sources, 238, (2013) p. 53-56, both of which are incorporated herein by reference.

In at least on variation, a defect doped Li solid-state electrolyte and/or positive electrode coating layer containing a defected doped inorganic precursor (MOX)' exhibits a cationic conductivity more than one order of magnitude, e.g., 1.5 orders of magnitude or two orders of magnitude, greater than a cationic conductivity of an doped Li solid-state electrolyte and/or positive electrode coating layer formed with and containing an undoped inorganic precursor MOX, but not including the inorganic precursor (MOX)'.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method comprising:
   mixing at least one oxide of M with at least one halide of M, where M is selected from at least one of Fe, Al, La, and Y, and the at least one halide of M is selected from at least one of a fluoride of M, a chloride of M, a bromide of M, and an iodide of M;
   heating the mixture of the at least one oxide of M and the at least one halide of M and forming an MOX inorganic oxyhalide compound, where X is at least one of F, Cl, Br, and I; and
   injecting defects in the MOX inorganic oxyhalide compound and forming a defect doped (MOX)' precursor for an ionic conductor.

2. The method according to claim 1, wherein the injecting defects in the MOX inorganic oxyhalide compound comprises contacting the MOX inorganic oxyhalide compound with a polar solvent.

3. The method according to claim 2, wherein the injecting defects in the MOX inorganic oxyhalide compound further comprises applying at least one of heat and pressure to the polar solvent in contact with the MOX inorganic oxyhalide compound.

4. The method according to claim 1, wherein the injecting defects in the MOX inorganic oxyhalide compound comprises contacting the MOX inorganic oxyhalide compound with a reducing atmosphere.

5. The method according to claim 4, wherein the injecting defects in the MOX inorganic oxyhalide compound further comprises applying at least one of heat and pressure to the reducing atmosphere in contact with the MOX inorganic oxyhalide compound.

6. The method according to claim 1, wherein the defect doped (MOX)' precursor further comprises x-ray diffraction peaks with a 2θ between about 63.3° and about 65.3°, and between about 76.6° and about 78.6°.

7. The method according to claim 1 further comprising forming a defect doped Li solid-state electrolyte containing the defect doped (MOX)' precursor, wherein the defect doped Li solid-state electrolyte has a cationic conductivity greater than $1.0 \times 10^{-5}$ S/cm at 25° C.

8. The method according to claim 7, wherein the cationic conductivity is greater than $2.5 \times 10^{-5}$ S/cm at 25° C.

9. The method according to claim 1 further comprising forming a defect doped Li solid-state electrolyte containing the defect doped (MOX)' precursor, wherein the defect doped Li solid-state electrolyte has a cationic conductivity greater than $5.5 \times 10^{-5}$ S/cm at 40° C.

10. The method according to claim 1 further comprising forming a positive electrode coating layer containing the defect doped (MOX)' precursor, wherein the positive electrode coating layer has a cationic conductivity greater than $1.0 \times 10^{-5}$ S/cm at 25° C.

11. The method according to claim 1 further comprising forming a positive electrode coating layer containing the defect doped (MOX)' precursor, wherein the positive electrode coating layer has a cationic conductivity greater than $5.5 \times 10^{-5}$ S/cm at 40° C.

12. A method comprising:
mixing at least one oxide of M with at least one halide of M, where M is selected from at least one of Fe, Al, La, and Y, and the at least one halide of M is selected from at least one of a fluoride of M, a chloride of M, a bromide of M, and an iodide of M;
heating the mixture of the at least one oxide of M and the at least one halide of M and forming an MOX inorganic oxyhalide compound, where X is at least one of F, Cl, Br, and I; and
injecting defects in the MOX inorganic oxyhalide compound by contacting the MOX inorganic oxyhalide compound with a polar solvent and forming a defect doped (MOX)' precursor for an ionic conductor.

13. The method according to claim 12, wherein the injecting defects in the MOX inorganic oxyhalide compound further comprises applying at least one of heat and pressure to the polar solvent in contact with the MOX inorganic oxyhalide compound.

14. The method according to claim 12, wherein the injecting defects in the MOX inorganic oxyhalide compound comprises contacting the MOX inorganic oxyhalide compound with a reducing atmosphere.

15. The method according to claim 14, wherein the injecting defects in the MOX inorganic oxyhalide compound further comprises applying at least one of heat and pressure to the reducing atmosphere in contact with the MOX inorganic oxyhalide compound.

16. The method according to claim 12, wherein the defect doped (MOX)' precursor further comprises x-ray diffraction peaks with a 2θ between about 63.3° and about 65.3°, and between about 76.6° and about 78.6°.

17. The method according to claim 12 further comprising forming a defect doped Li solid-state electrolyte containing the defect doped (MOX)' precursor, wherein the defect doped Li solid-state electrolyte has a cationic conductivity greater than $1.0 \times 10^{-5}$ S/cm at 25° C.

18. The method according to claim 17, wherein the cationic conductivity is greater than $2.5 \times 10^{-5}$ S/cm at 25° C.

19. The method according to claim 12 further comprising forming a defect doped Li solid-state electrolyte containing the defect doped (MOX)' precursor, wherein the defect doped Li solid-state electrolyte has a cationic conductivity greater than $5.5 \times 10^{-5}$ S/cm at 40° C.

20. The method according to claim 12 further comprising forming a positive electrode coating layer containing the defect doped (MOX)' precursor, wherein the positive electrode coating layer has a cationic conductivity greater than $1.0 \times 10^{-5}$ S/cm at 25° C.

* * * * *